T. G. Harold,
Toasting Fork.

№ 46,235. Patented Feb. 7, 1865.

Witnesses.

Thos. Geo. Harold

Lemuel W. Serrell
Chas. H. Smith

UNITED STATES PATENT OFFICE.

THOMAS GEORGE HAROLD, OF BROOKLYN, NEW YORK.

IMPROVED WIRE FORK FOR TOASTING, &c.

Specification forming part of Letters Patent No. 46,235, dated February 7, 1865.

*To all whom it may concern:*

Be it known that I, THOS. GEO. HAROLD, of Brooklyn, in the county of Kings and State of New York, have invented, made, and applied to use a new and useful Improvement in Forks or Clamps for Toasting Bread, Broiling Meat, &c.; and I do hereby declare the following to be a full, clear, and exact description of the construction and operation of the same, reference being had to the annexed drawings, making part of this specification, wherein—

Figure 1:
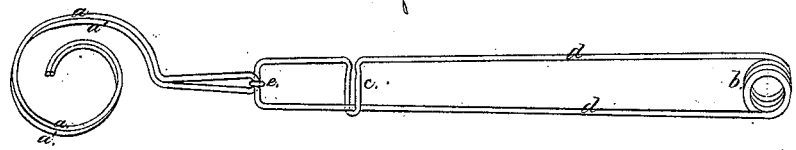
Figure 2:
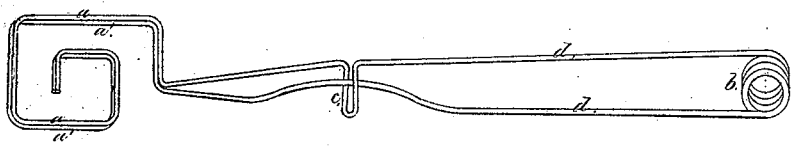
Figure 3:
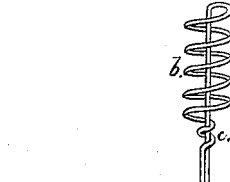

Figure 1 is a perspective view of my said improvement. Figs. 2 and 3 are slight modifications of the same.

Similar marks of reference denote the same parts in all the figures.

Various devices have heretofore been made for toasting bread, broiling meat, &c., all of which have been more or less costly to manufacture and unhandy to operate.

The nature of my said invention consists in spring-tongs formed with snail shaped clamping ends, so that said clamps are separated by the pressure of the hand and spring together when the pressure is released, and said clamps are guided so that they come properly together.

In the drawings, *a a'* are the clamps, pressed toward each other by the spring *b*, and kept in correct position by the guide *c* on the handle part *d*, or by a ring, *e*. (See Fig. 1.)

It will be seen that in Fig. 1 the wires forming the handle are crossed, so that when the handle-wires are pressed toward each other the clamps will separate, and bread, meat, &c., can be placed between them and held in place by the spring of the fork while being toasted or broiled. In Fig. 2 the handle-wires are not crossed, and therefore to introduce the article to be toasted or broiled the handle-wires have to be sprung apart. In Fig. 3 I have shown the clamps bent at right angles to the handle-part of the fork or broiler, and guided by twisting the handle-wires around each other, and the spring is wound lengthwise of the handle in order to press the clamps together.

It will be seen that the said fork or clamp can be formed of one piece of wire, and that the same is strong, durable, easily constructed, and very convenient to operate. I do not, however, confine myself to this precise construction, as the same could be formed of two pieces of wire terminating in any suitable handle, and in that case two springs, instead of one, may be used to press the clamps toward each other.

Having thus described my said invention, what I claim, and desire to secure by Letters Patent, is—

1. Constructing an apparatus for toasting, broiling, &c., of two clamps pressed toward each other by a spring or springs, in substantially the manner described and shown.

2. Retaining the said clamps in correct position to each other by guides, in the manner and for the purposes specified.

3. The combination of the clamps *a a'*, spring *b*, and guides *c* or *e*, for the purposes set forth.

In witness whereof I have hereunto set my signature this 30th day of June, 1864.

THOS. GEO. HAROLD.

Witnesses:
 LEMUEL W. SERRELL,
 CHAS. H. SMITH.